US 9,752,886 B2

United States Patent
Cai

(10) Patent No.: US 9,752,886 B2
(45) Date of Patent: Sep. 5, 2017

(54) MOBILE TRIP PLANNER AND LIVE ROUTE UPDATE SYSTEM

(71) Applicant: Danqing Cai, Singapore (SG)

(72) Inventor: Danqing Cai, Singapore (SG)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 13/928,758

(22) Filed: Jun. 27, 2013

(65) Prior Publication Data
US 2015/0006071 A1 Jan. 1, 2015

(51) Int. Cl.
*G01C 21/34* (2006.01)

(52) U.S. Cl.
CPC .................. *G01C 21/3492* (2013.01)

(58) Field of Classification Search
CPC .................................................. G01C 21/3415
See application file for complete search history.

(56) References Cited

U.S. PATENT DOCUMENTS

| | | | | |
|---|---|---|---|---|
| 6,965,829 | B2* | 11/2005 | Yamadaji et al. | 701/301 |
| 8,024,111 | B1* | 9/2011 | Meadows et al. | 701/414 |
| 8,041,660 | B2* | 10/2011 | Stehle et al. | 706/14 |
| 8,190,362 | B2* | 5/2012 | Barker et al. | 701/414 |
| 8,437,948 | B1* | 5/2013 | Balasundaram et al. | 701/117 |
| 8,606,517 | B1* | 12/2013 | Ehrlacher et al. | 701/465 |
| 8,615,354 | B2* | 12/2013 | Barker et al. | 701/117 |
| 8,762,049 | B2* | 6/2014 | Feng | 701/411 |
| 8,768,605 | B2* | 7/2014 | Heaps et al. | 701/117 |
| 2003/0135304 | A1* | 7/2003 | Sroub | G06Q 10/08 701/1 |
| 2004/0024523 | A1* | 2/2004 | Uotani | 701/210 |
| 2004/0049343 | A1* | 3/2004 | Yamadaji et al. | 701/301 |
| 2004/0249568 | A1* | 12/2004 | Endo | G01C 21/3492 701/410 |
| 2005/0027447 | A1* | 2/2005 | Hirose et al. | 701/210 |
| 2006/0009908 | A1* | 1/2006 | Tomita | G01C 21/3492 701/411 |
| 2008/0208441 | A1* | 8/2008 | Cheung | 701/117 |
| 2009/0018760 | A1* | 1/2009 | Heaps et al. | 701/117 |
| 2009/0070024 | A1* | 3/2009 | Burchard et al. | 701/117 |
| 2009/0204320 | A1* | 8/2009 | Shaffer et al. | 701/202 |
| 2011/0106592 | A1* | 5/2011 | Stehle et al. | 705/14.1 |
| 2011/0224898 | A1* | 9/2011 | Scofield et al. | 701/200 |
| 2012/0066251 | A1* | 3/2012 | Gontmakher et al. | 707/769 |
| 2012/0226434 | A1* | 9/2012 | Chiu | 701/117 |
| 2012/0296559 | A1* | 11/2012 | Gueziec et al. | 701/117 |

(Continued)

OTHER PUBLICATIONS

IBM Traffic Prediction Tool, http://www.ibm.com/smarterplanet/us/en/transportation_systems/nextsteps/solution/N500945X17585D04.html, Jun. 27, 2013.

*Primary Examiner* — Krishnan Ramesh
(74) *Attorney, Agent, or Firm* — Mintz Levin Cohn Ferris Glovsky and Popeo, P.C.

(57) ABSTRACT

A method for providing trip planning and route update is provided. The method includes receiving traffic demand data including a plurality of planned trips, each including an origin location, a destination location, a planned route, a planned departure time, and an end time. The method further includes building a traffic prediction model by aggregating the traffic demand data, and generating a traffic prediction for a specified trip. Related apparatus, systems, techniques and articles are also described.

18 Claims, 10 Drawing Sheets

(56) References Cited

U.S. PATENT DOCUMENTS

| | | | |
|---|---|---|---|
| 2013/0262222 A1* | 10/2013 | Gibson et al. | 705/14.49 |
| 2013/0268187 A1* | 10/2013 | Scofield et al. | 701/400 |
| 2013/0344859 A1* | 12/2013 | Abramson et al. | 455/418 |
| 2014/0249734 A1* | 9/2014 | Gueziec et al. | 701/117 |
| 2014/0358437 A1* | 12/2014 | Fletcher | G01C 21/3617 |
| | | | 701/533 |

* cited by examiner

MOBILE TRIP PLANNER AND LIVE ROUTE UPDATE SYSTEM

TECHNICAL FIELD

The subject matter described herein relates to a trip planner and route update system, and particularly, to a mobile trip planner and live route update system.

BACKGROUND

Road transportation in most mega cities, such as those with more than 5 million popular, faces traffic congestion issues caused by increasing number of vehicles and accidents. Since new road construction can be very expensive and sometimes unfeasible due to geographic, structural, or restraints, municipalities are often limited to the existing road infrastructure, and thus unable to cope with the increasing demand. As a result, drivers around the world are faced with increasing traffic congestion and longer travel time. This produces an enormous waste of natural resources and productivity, and generates additional pollution.

Efficient trip planning is difficult because road transportation is spontaneous, with many unexpected/unpredictable but frequently occurring events such as accidents, oil spills, construction, weather and many other factors, which can all contribute to unexpected/unpredictable traffic delays.

While there are existing systems that attempt to address aspects of traffic issues, those systems often focus on the so-called live traffic report and do not address the core of the problem—the lack of sensible and feasible planning.

For example, IBM provides a traffic prediction tool (http://www.ibm.com/smarterplanet/us/en/transportation_systems/nextsteps/solution/N500945X17585D04.html) that utilizes historical traffic data and real-time traffic input from a city's transport system to predict traffic flows over pre-set durations of 10, 15, 30, 45, and 60 minutes. This tool, however, is provided at the macro level for traffic controllers/operators to anticipate and better manage the flow of traffic to prevent the buildup of congestion (e.g., in proactive signal setting and ramp metering), and does not provide functionality for the individual drivers (end users).

Existing trip planning devices such as portable automotive GPS systems or mobile devices running trip planning applications like Google Map also suffer from a number of disadvantages. For example, while existing trip planning devices and services can provide a live traffic layer on top of personalized trip planning using various sensor networks or crowd sourcing, they unnecessarily transmit a lot of irrelevant/extraneous data to the users. For example, when a user is traveling from point A to B, he/she is typically only interested in things that are relevant along the route, between the two points. Existing applications will nevertheless stream all traffic data across the entire area along the route. Transmitting more data than necessary reduces both application performance and usability. Furthermore, the so-called "live" information is actually based on data that are approximately 5-10 minutes old, and thus may no longer be accurate since, e.g., traffic can build up or dissipate quickly. Consequently, a route that is generated based on old and potentially inaccurate data (e.g. to avoid a previous congested section) may not be efficient if, e.g., the traffic congestion of a road section had already cleared up. Furthermore, these devices/applications cannot predict future congestions.

SUMMARY

The present subject matter provides a computer-implemented method for trip planning. The method includes: receiving traffic demand data comprising a plurality of planned trips, each of the planned trips comprising an origin location, a destination location, a planned route, a departure time in the future, and an end time; building a traffic prediction model by aggregating the traffic demand data; and generating a traffic prediction for a specified trip, the specified trip comprising a specified origin location, a specified destination location, a specified planned route, a specified departure time, and a specified end time, the traffic prediction being generated by checking the specified trip against the traffic prediction model for route overlap between the specified planned route and the planned route of each of the plurality of planned trips, and for travel time overlap between the specified departure and end time, and the departure and end time of each of the plurality of planned trips.

The present subject matter also provides a non-transitory computer readable medium comprising instructions, which when executed by one or more processors, perform the method for trip planning including: receiving traffic demand data comprising a plurality of planned trips, each of the planned trips comprising an origin location, a destination location, a planned route, a departure time in the future, and an end time; building a traffic prediction model by aggregating the traffic demand data; and generating a traffic prediction for a specified trip, the specified trip comprising a specified origin location, a specified destination location, a specified planned route, a specified departure time, and a specified end time, the traffic prediction being generated by checking the specified trip against the traffic prediction model for route overlap between the specified planned route and the planned route of each of the plurality of planned trips, and for travel time overlap between the specified departure and end time, and the departure and end time of each of the plurality of planned trips.

In some variations, the method can further include one or more sensor data and training the traffic prediction model using the one or more sensor data.

In some variations, if a route overlap is found, the method further includes generating a new route from the specified origin to the specified destination by avoiding route overlap and travel time overlap with the traffic demand data of the traffic prediction model. The method can also further include receiving an actual departure time, and updating the traffic prediction using the actual departure time instead of the specified departure time.

In some variations of the present subject matter, if a further route overlap is found, the method further comprises generating a further route from the specified origin to the specified destination by avoiding route overlap and travel time overlap with the traffic demand data of the traffic prediction model. In some variations, the plurality of planned trips is generated based on a plurality of prior recurring trips.

The present subject matter also provides a trip planning system including: a database configured for storing traffic demand data comprising a plurality of planned trips, each of the planned trips comprising an origin location, a destination location, a planned route, a departure time in the future, and an end time; a traffic prediction modeler configured for aggregating the traffic demand data and generating a traffic prediction model; and a traffic prediction generator configured for generating a traffic prediction for a specified trip, the specified trip comprising a specified origin location, a specified destination location, a specified planned route, a specified departure time, and a specified end time, the traffic prediction being generated by checking the specified trip against the traffic prediction model for route overlap between the specified planned route and the planned route of each of the plurality of planned trips, and for travel time overlap between the specified departure and end time, and the departure and end time of each of the plurality of planned trips.

In some variations of the present subject matter, the database is further configured to store one or more sensor data, and the traffic prediction modeler is further configured for training the traffic prediction model using the one or more sensor data.

In some variations, if a route overlap is found, the traffic prediction generator is further configured for generating a new route from the specified origin to the specified destination by avoiding route overlap and travel time overlap with the traffic demand data of the traffic prediction model.

In some variations of the present subject matter, the database is further configured for storing an actual departure time, and the traffic prediction generator is further configured for updating the traffic prediction using the actual departure time instead of the specified departure time.

In some variations, if a further route overlap is found, the traffic prediction generator is further configured for generating a further route from the specified origin to the specified destination by avoiding route overlap and travel time overlap with the traffic demand data of the traffic prediction model.

In some variations of the present subject matter, the plurality of planned trips is generated by the traffic prediction generator based on a plurality of prior recurring trips.

Computer program products are also described that comprise non-transitory computer readable media storing instructions, which when executed one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the present subject matter can provide an easy/intuitive way for drivers of motor vehicles (private or commercial) to plan their trip and notify a central system or a road authority, to collect, e.g., trip start/end status in real time. The present subject matter can also provide real time update of traffic conditions to drivers.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Roads are in some ways analogous to production lines of a manufacturing factory. For example, both road transportation and manufacturing deal with capacity and demand: while a factory aims to match raw materials/parts with equipment/workforce capacities, transportation needs to match motor vehicles with roads/highways. Additionally, they both have a relatively static capacity: the number of equipment, and workforce do not change drastically on a daily basis just as roads/highways. The real differences include, for example, (1) while the demand of a factory can be carefully collected, planned, and scheduled to match capacity, the demand of road infrastructure by motor vehicles is uncontrolled since, e.g., drivers are typically free to embark on any journey at will; and (2) modeling of road capacity is complicated as many unexpected/unpredictable bottleneck factors can come into play, in addition to more stable parameters such as the length and number of lanes.

By implementing features of the present subject matter, at least some of the limitations of existing technology can be overcome. For example, by collecting data of planned trips including, e.g., the route, start/end time and status, in real time, a better traffic demand/prediction model can be built and trained, and more accurate predictions as well as live traffic conditions can provided for drivers.

Figure 1:
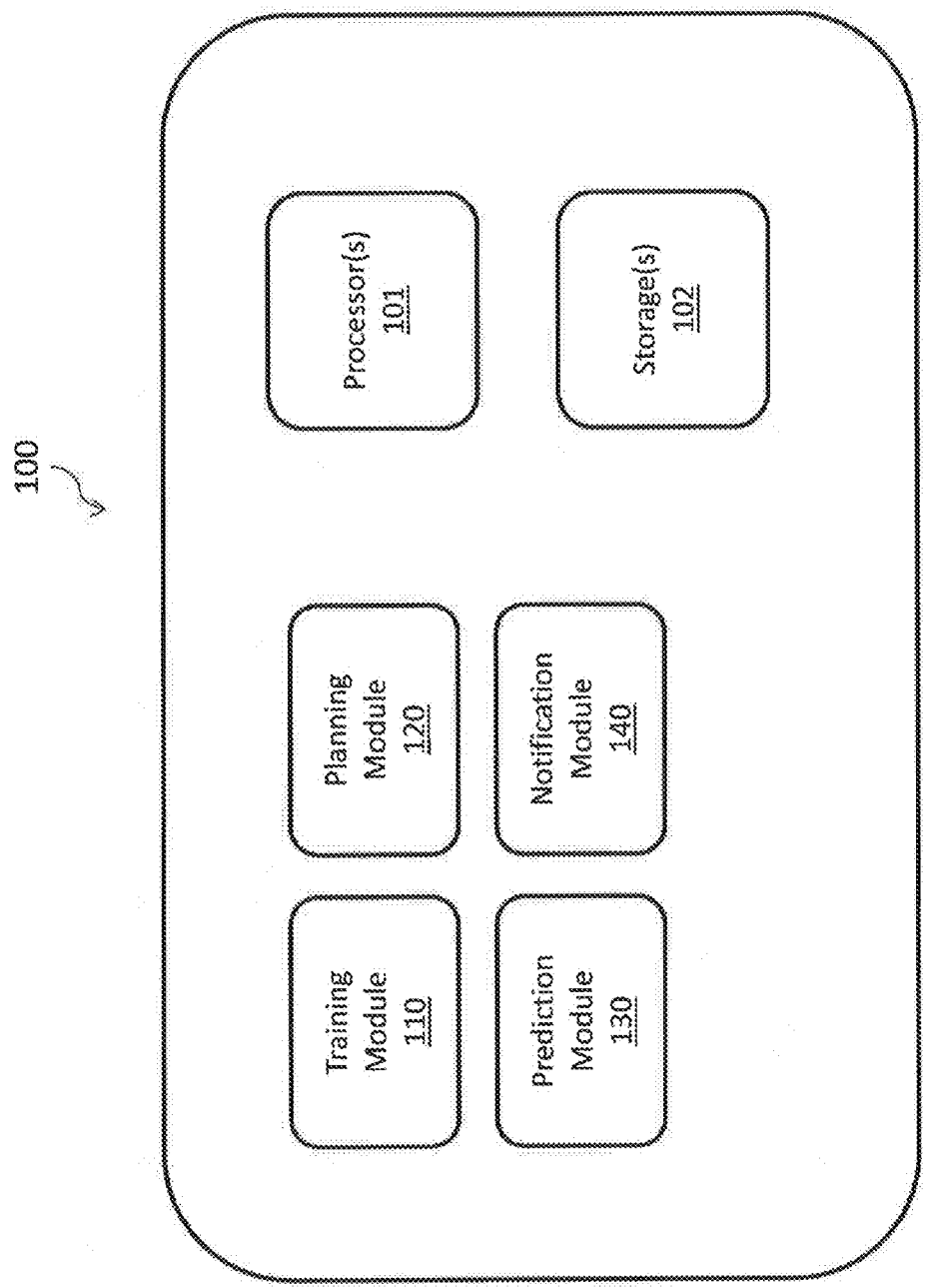
FIG. 1 is a diagram illustrating a system in accordance with an implementation of the present subject matter.

FIG. 1 is a diagram illustrating a mobile trip planner and live route update system 100 in accordance with the present subject matter. System 100 includes a plurality of components including: one or more computer/data processors 101, one or more data storages 102, training module 110, planning module 120, prediction module 130, and notification module 140. Each of the modules can be implemented via software (e.g. computer instructions executable by one or more processors), hardware, or any combination thereof. Although these modules are shown to be separate modules, which can be advantageous for ease of updates and modifications, in some variations, one or more of the modules can be combined with one another. For example, the training module 110 and prediction module 130 may be implemented as a single module, while the planning module 120 and the notification module 140 can be implemented as a single module. In some variations, features of the modules can be divided into additional modules.

While details of the features implemented in these modules will be discussed later, as an overview, training module 110 can be configured build and train a traffic prediction model, the planning module 120 can configured to provide planning functionalities, the prediction module 130 can be configured to predict, e.g., one or more traffic characteristics, and the notification module 140 can be configured to transmit, e.g., trip planning data.

Figure 2:
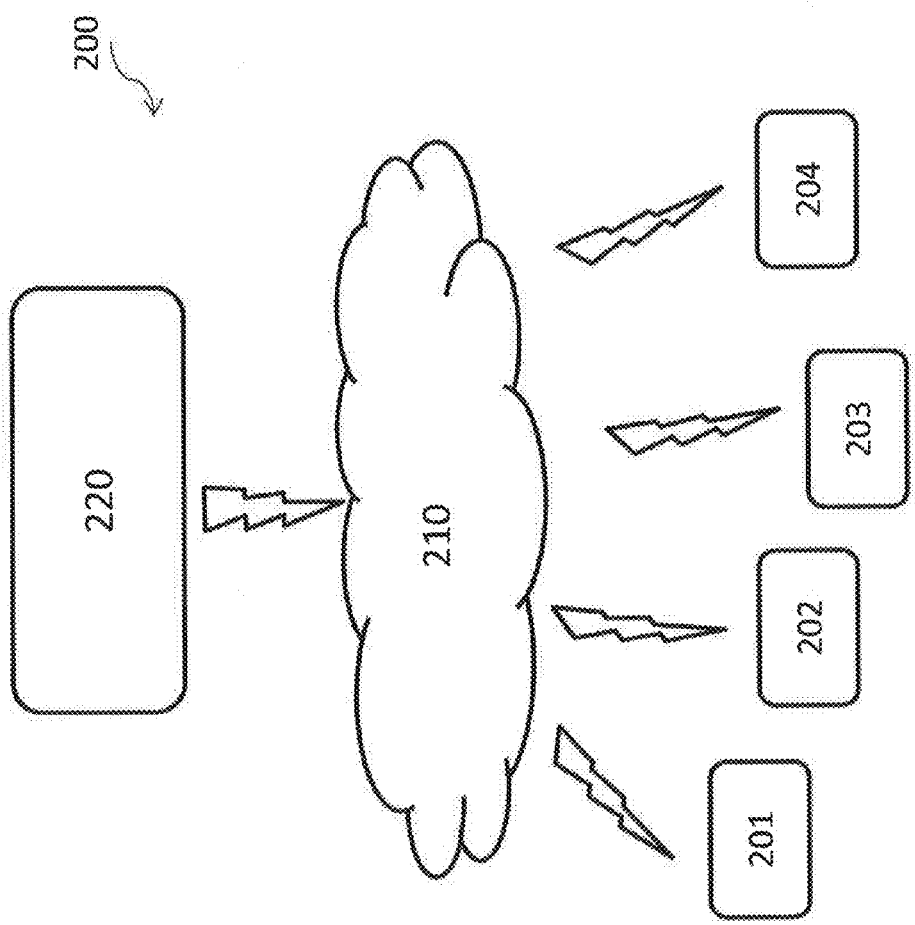
FIG. 2 is a diagram illustrating an architecture in accordance with an implementation of the present subject matter.

FIG. 2 shows a mobile trip planner and live route update architecture 200 of an implementation of the present subject matter. As can be seen, architecture 200 includes one or more mobile devices 201, 202, 203, 204 (fewer or more as desired), which are in data communication with a cloud server 210, which is in turn in data communication with a mobile trip planner and live route update system 220 in accordance with the present subject matter.

Mobile devices 201-204 can each be, e.g., a smartphone, a tablet, a GPS navigation device and the like, and can include one or more components such as: motion sensor(s) including, e.g., gyroscopes, GPS receiver, camera, input device (such as a touch screen), display, as well as one or more data processors and storage configured for processing and transmitting/receiving data.

Cloud server 210 can be, e.g., a web server having an interface or application for communication with the mobile devices and system 220, which can be, e.g., system 100 of FIG. 1. In some variations, system 220 is integrated with cloud server 210, e.g., to communicate directly with the mobile devices. In some variations, additional layers of communication can be added, e.g., between the mobile devices and the cloud server, and/or between the cloud server and the system.

Figure 3:
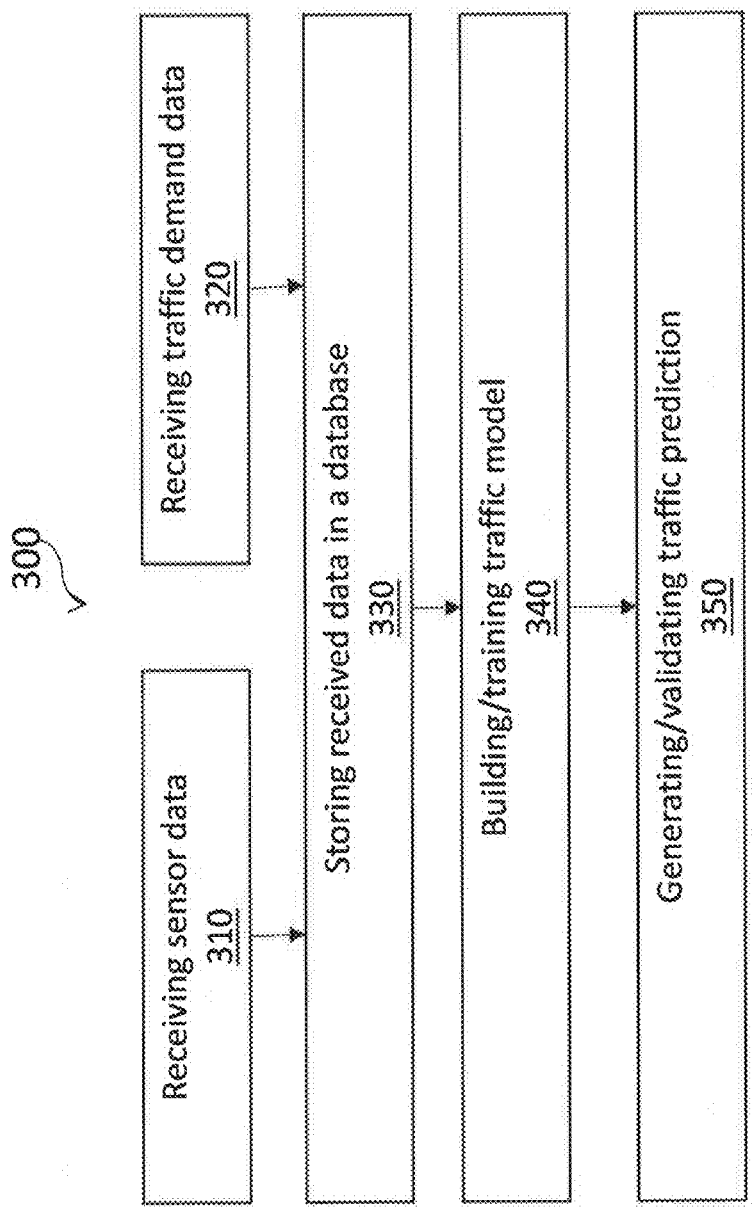
FIG. 3 is a process flow diagram illustrating features in accordance with the present subject matter.

FIG. 3 shows a process flow diagram 300 in accordance with an implementation of the present subject matter for providing, e.g., features of the training module 110 and prediction module 130. At 310, the system receives sensor data from one of the mobile devices. The sensor data can include one or more data such as motion sensor data, gyroscope sensor data, GPS data, date, time, and the like. The system stores the sensor data in a database at 330, and builds and/or trains a traffic model at 340. As more data is received and stored in the database, the traffic model can be trained to better predict traffic patterns. Based on the latest traffic model, the system can generate and/or validate traffic prediction at 350.

Figure 4:
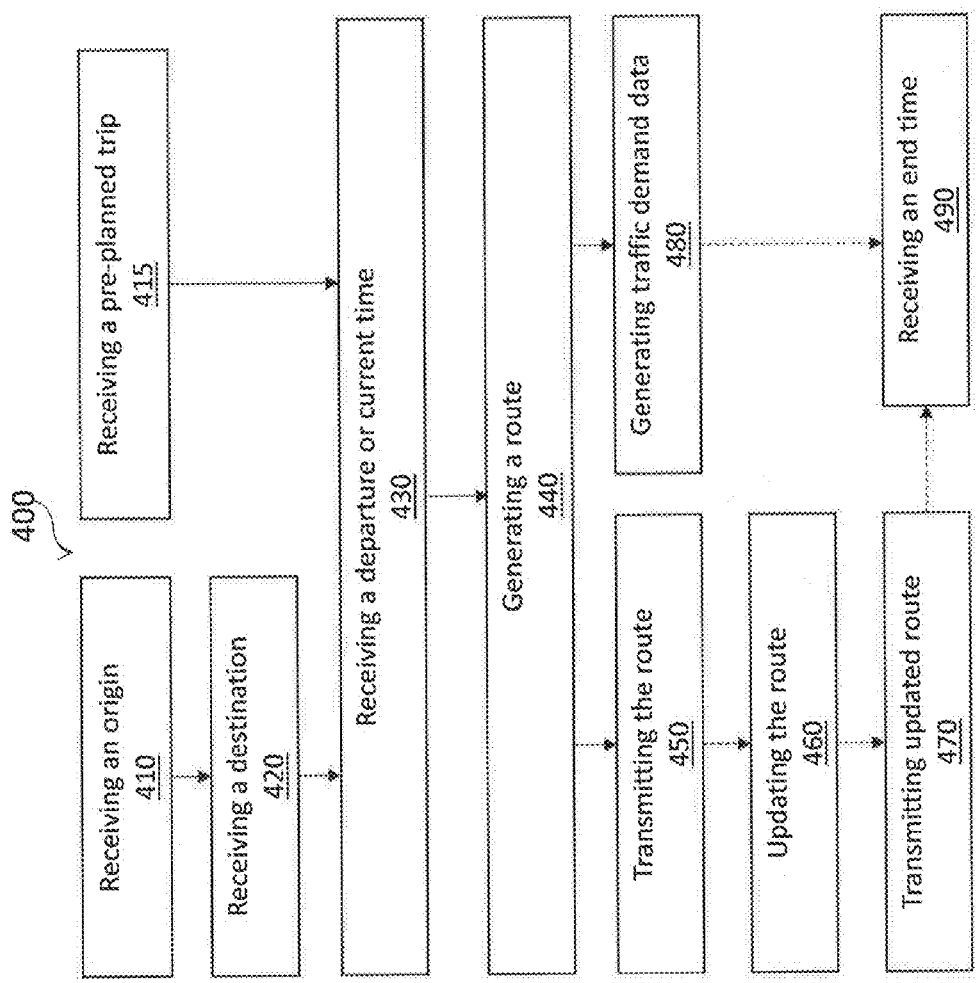
FIG. 4 is a process flow diagram illustrating additional features in accordance with the present subject matter.

FIG. 4 shows a process flow diagram 400 in accordance with an implementation of the present subject matter for providing, e.g., features of the planning module 120 and notification module 140. At 410 and 420, the system receives origin data and destination data, each can be, e.g., location data (the ordering of these steps can be interchanged). At 430, the system receives a departure time (e.g. for a future trip) or a current time (e.g. if the user is ready to embark on the trip). Based on these data, the system generates a route at 440, and transmits the route at 450. In some variations, the route can be generated using, e.g., the traffic model discussed with respect to FIG. 3. In some variations, the system calculates an estimated travel time and/or arrival time, and takes it into account in generating the route. At 480, the system generates traffic demand data, which can be utilized in building/training the traffic model. The traffic demand data can include one or more of: e.g., the generated route, the departure or current time, the estimated travel time, and the arrival time.

At 460 and 470, the system can optionally update the route (e.g. based on the latest traffic model) and transmit the updated route to the mobile devices. At 490, the system receives an end time when the user reaches the destination. Although not shown, the system can generate updated traffic data with the end time for building/training the traffic model.

In some variations, e.g., before the user embarks on the journey, the system can determine one or more route candidates from the origin to the destination. The system can calculate one or more characteristics for each route candidate including, e.g., the travel distance, tolls and the number of traffic lights along the route. The system can also calculate the total journey time of each route candidate and suggest the route based one or more criteria including, e.g., (1) least estimated journey time based on live and predicted traffic updates, (2) least standard deviation of journey time against historical demand fluctuations, and (3) largest number of historical adoptions by the user. In some variations, when there is no significant differences in the predicted journey time (e.g., mean and standard deviation), a further criterion—user preference, can be factored in when determining the suggested route.

In some variations, during the journey, automatic update of route can be provided when, e.g., (1) system receives enough evidence of either demand building up or new bottleneck forming in the road sections coming up based on live demand and traffic reports; and/or (2) a significantly better optional route has been discovered by the system. These and/or one or more alternate routes can be displayed to the user, to enable user-selection. In some variations, one or more threshold factors can be provided, for example, to enable auto update when a new route can reduce the remaining travel time by a factor of, e.g., a threshold percent. In some variations, the updates can be communicated in a safe-driving way such as one or more voice notifications pushed to the mobile device.

It should be noted that by utilizing the traffic demand data, which includes data on planned trips, as well as live data (which eventually becomes historic data), the traffic model and be built/trained to provide more accurate predictions of future traffic conditions.

As shown, the system can receive a pre-planned trip 415, which also includes origin and destination data. In some variations, the pre-planned trip can be a trip that the user intends to take in the future, or a trip that is taken frequently and/or recurring (e.g., to home, to office, to supermarket). The origin may be pre-configured, or may be the user's current location (e.g., manually entered or GPS data from the mobile device).

In some variations, the departure time can be pre-configured (e.g., manually entered), based on a previous time when the trip was taken (e.g., the last time), or an estimated time based on historical data and/or model. In some variations, the end time similarly can also be pre-configured (e.g. manually entered), based on a previous time when the trip was taken (e.g., the last time), or an estimated time based on historical data and/or model.

In some variations, the mobile device can be configured to automatically detect when the user embarks on a trip (e.g. using GPS and/or sensor data). The mobile device can also be configured to transmit data such as time, location, and sensor data automatically during the trip, and/or record the data to be transmitted later. In some variations, the mobile device can also be configured to enter a driving mode when it detects the start of a trip (e.g. through sensors or GPS).

In some variations, the system can be configured to transmit live data received from other mobile devices that are relevant to a user's trip to the user to provide, e.g., live update of traffic conditions.

In some variations, the generated route is determined based on one or more of: live traffic data (e.g. from the traffic model), journey time estimation, per time range and per road section. A road section can be, e.g., a part of a road between two consecutive static bottlenecks such as junctions/traffic lights/ramps/exits. In some variations, automatic update of route can happen when (1) system receives enough evidence of either demand building tip or new bottleneck forming in the road sections coming up based on live demand and traffic reports; and/or (2) a significantly better optional/alternate route in terms of remaining journey time has been discovered by the system. In some variations, the user can select one or more threshold factors, for example, to enable auto update whenever the new route can reduce the remaining journey time by a threshold percentage. In some variations, the update can be communicated in a safe-driving way such as one or more voice notifications pushed to the mobile device. For example, if the system determines there is large demand on the planned road section and planned time period, warning can be generated and displayed on the mobile device to alert the user to opt for a different route.

In some variations, live notifications can be pushed to the mobile devices about the road sections that are ahead or relevant to the trip if the system predicts one or more of, for example, a buildup of traffic congestion, and generates a different route for the user.

Figure 5:
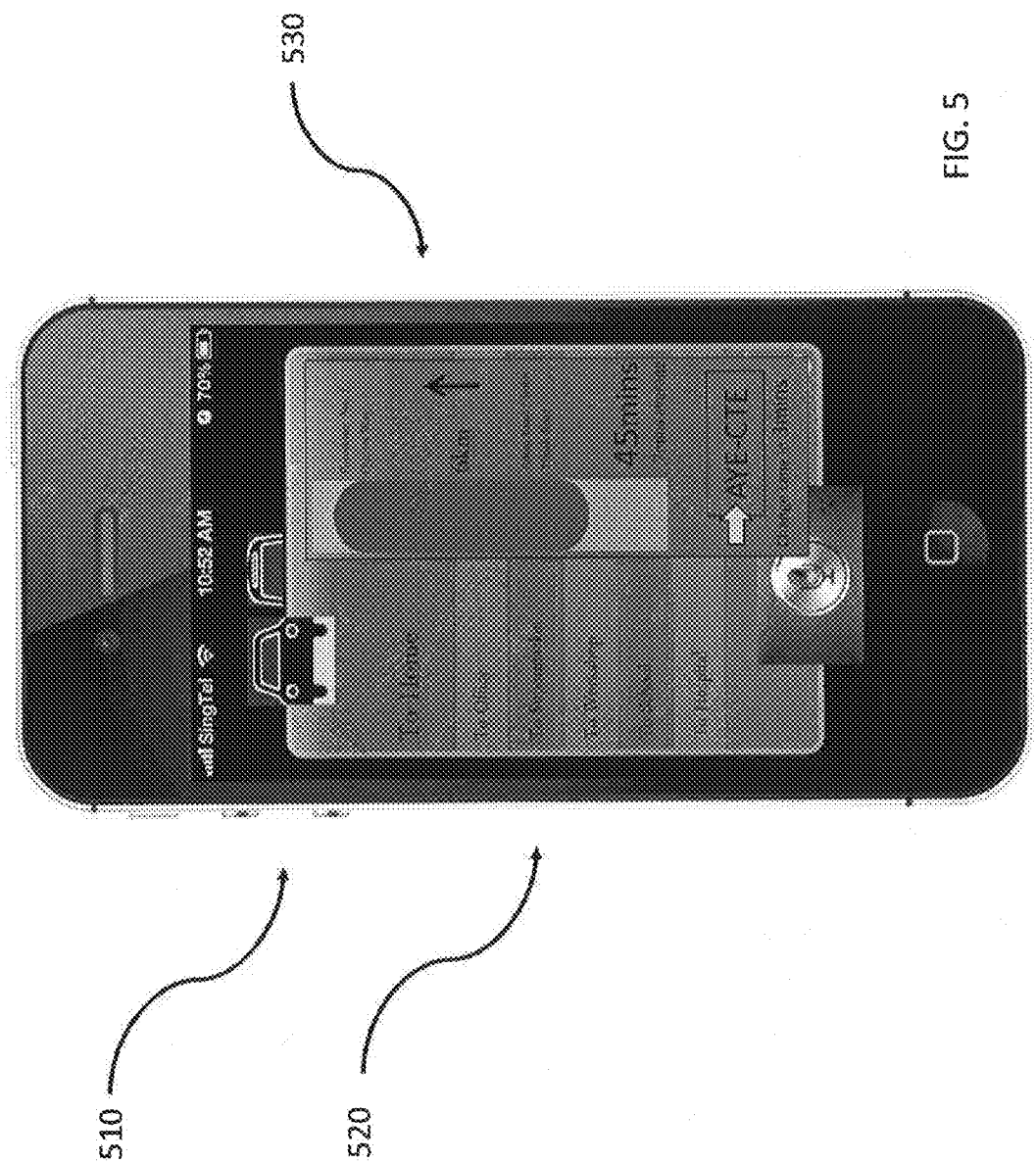
FIGS. 5-6 are illustrations of a user-interface in accordance with the present subject matter.

References will now be made to FIGS. 5-10, which show various implementations of user interface that can be provided on the mobile device as well as some of the display features. FIG. 5 shows the display of a mobile device. The display includes a mode of transportation 510 (e.g., in the "driving" mode as shown), a planned trip section 520 showing the pre-configured planned trips (e.g., To Home, To Office, To Supermarket, To Workshop, To School, and To Hospital), and trip data 530 showing, e.g., the estimated time. In some variations, for a transportation mode such as private or public, the trip data 530/630 can include the selected route, e.g., shown as stacked and/or colored columns (or bars) with the stacks representing the road sections, the estimated journey time vs. a standard journey time. In some variations, additional information can also be provided for the user.

In some variations, the trip data can be updated by the actual journey detected (e.g. based on GPS data from the mobile device). For example, when heavy traffic is detected, one or more new route options can be generated and pushed to the mobile device as, e.g., voice and/or text notifications.

Figure 6:
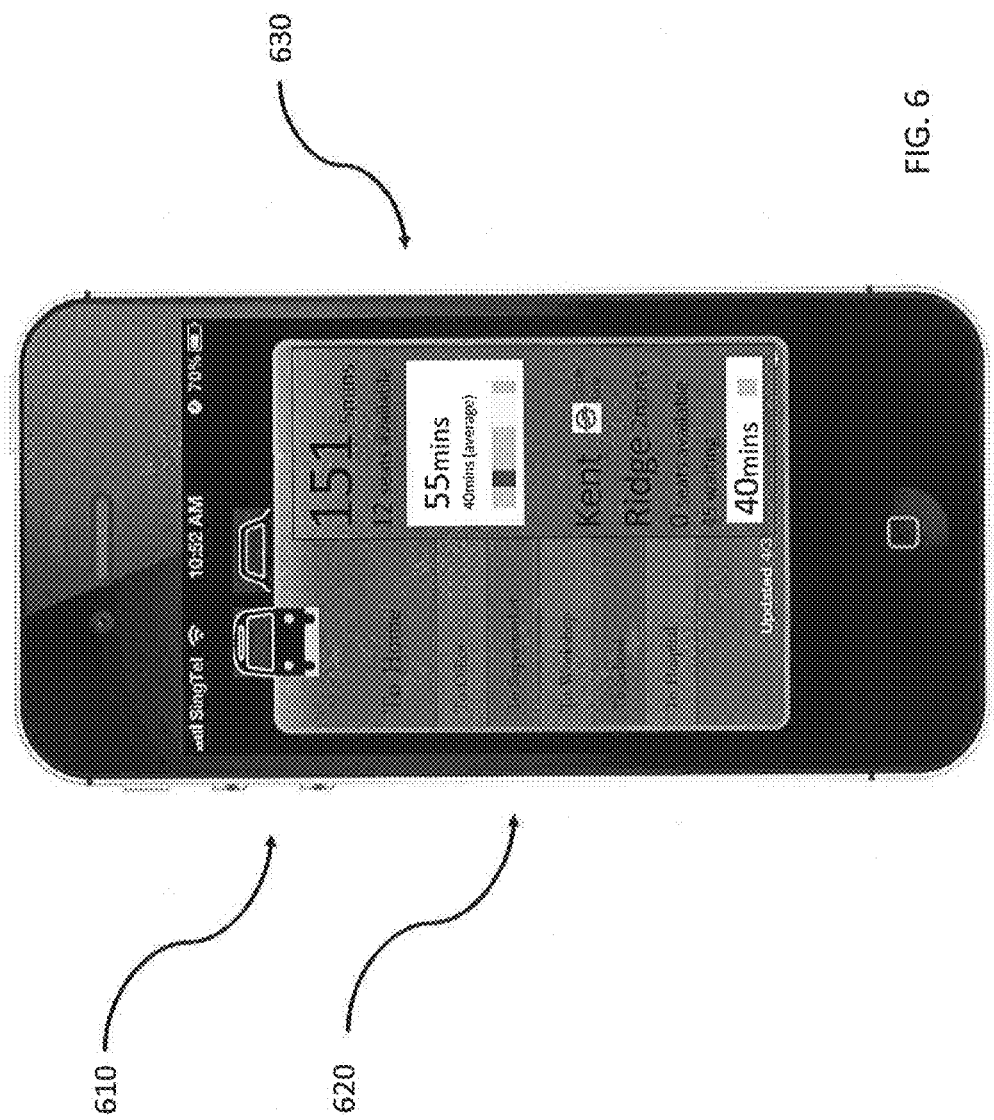
Figure 7:
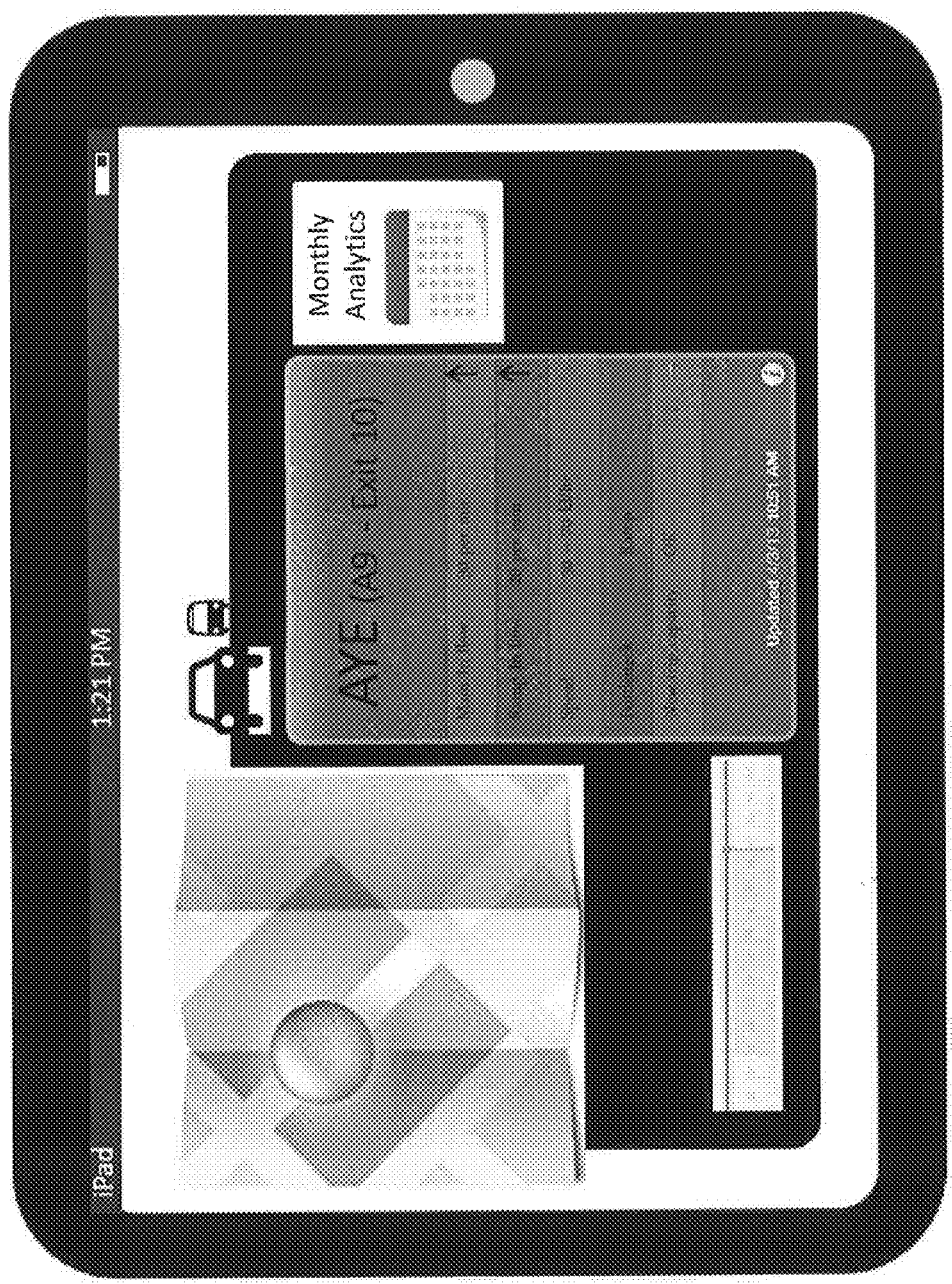
FIGS. 7-10 are illustrations of another use-interface in accordance with the present subject matter.
Figure 8:
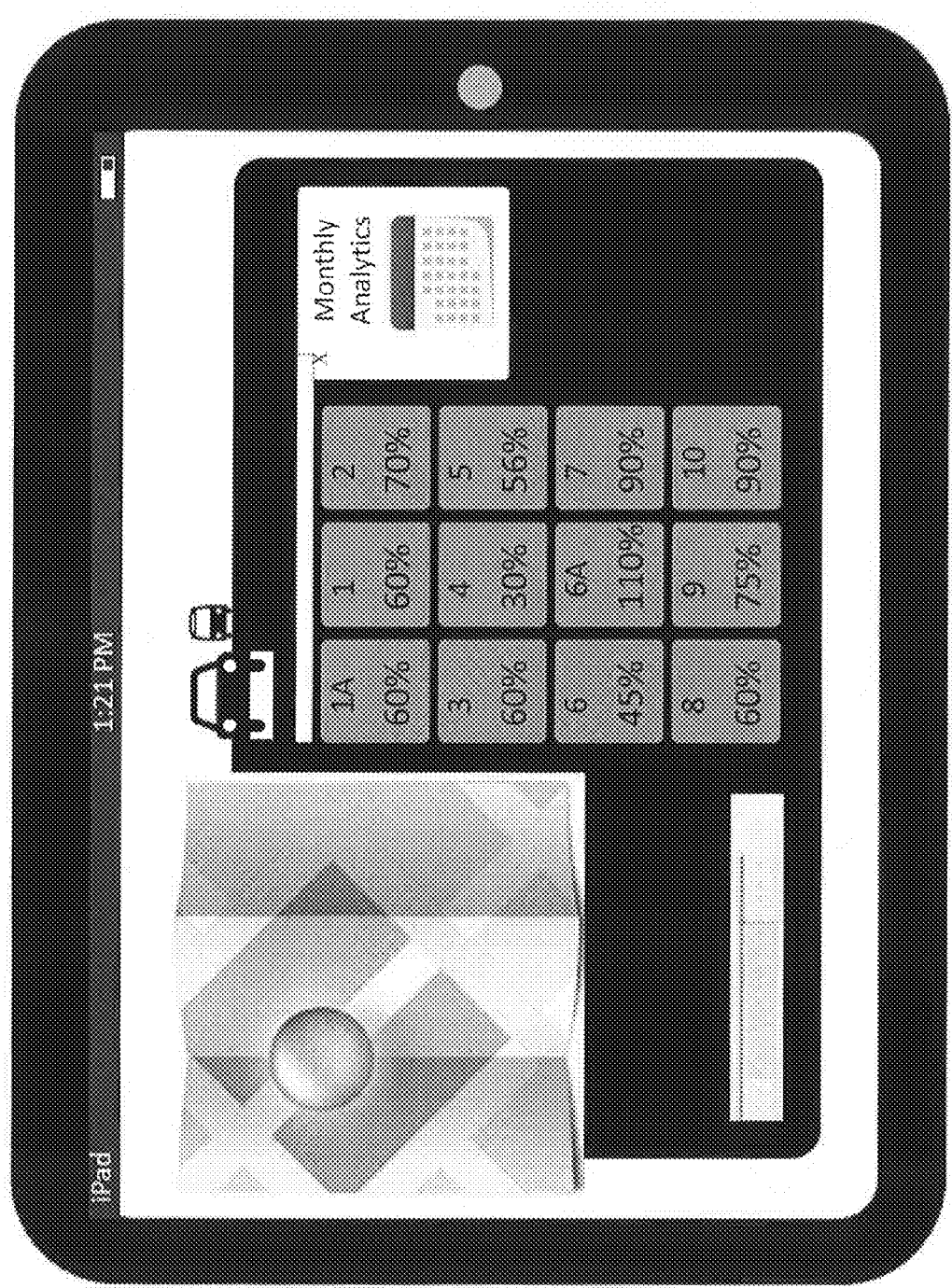
Figure 9:
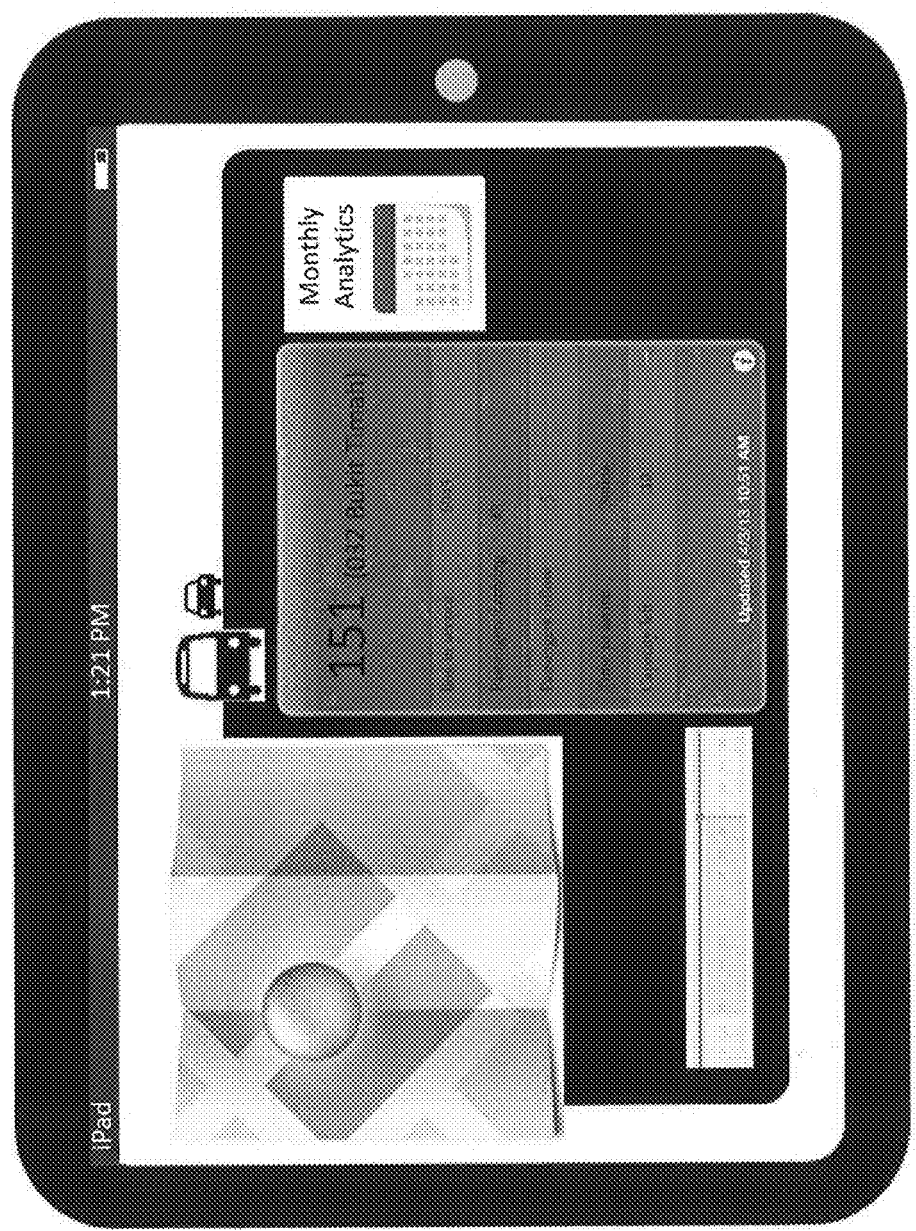
Figure 10:
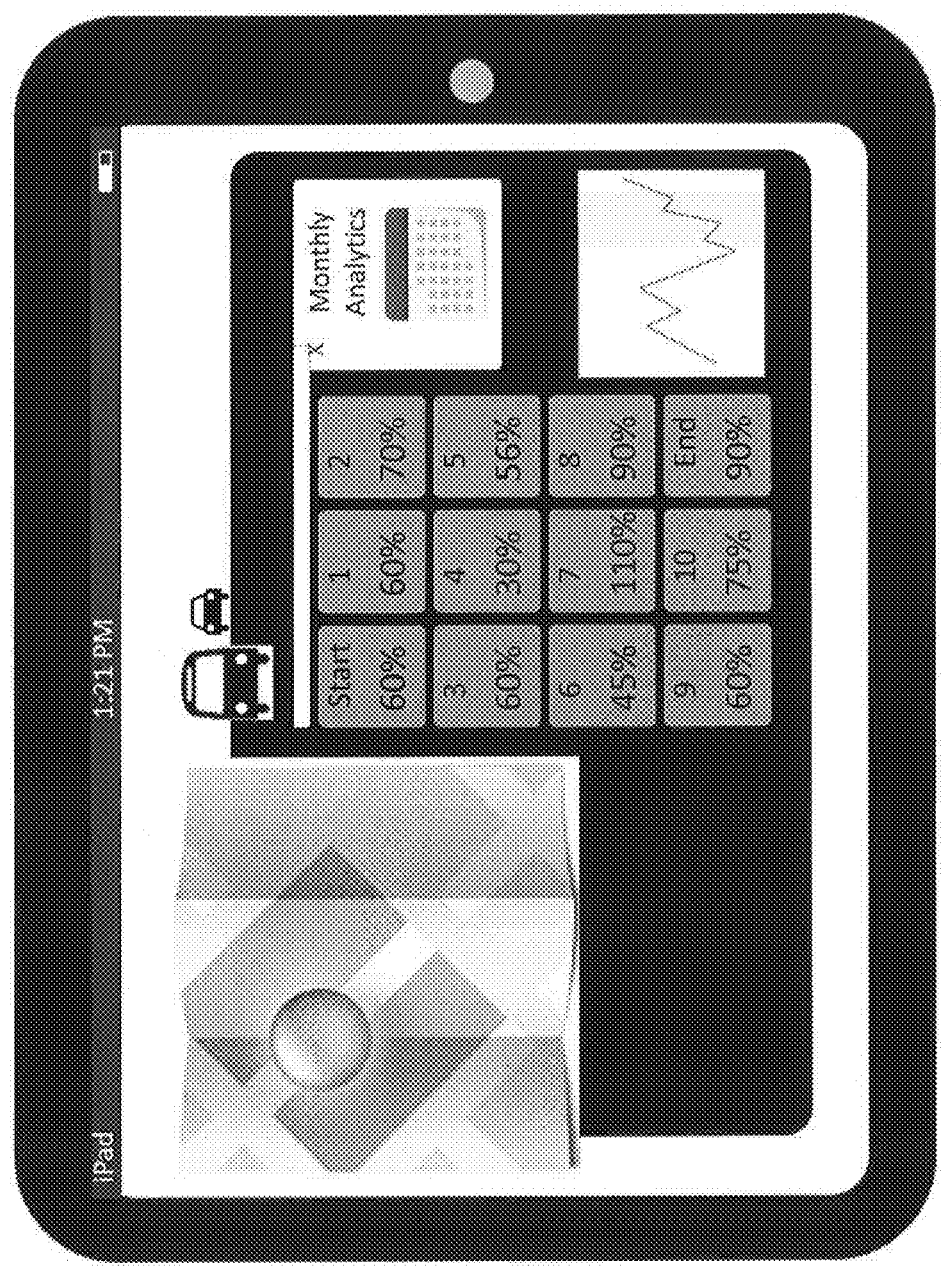

In some variations, e.g., as shown in FIG. 6, a public transportation mode 610 can be provided with trip information 630, e.g., seating information collected from a central ticketing system (i.e. Translink in Singapore, from which it is possible to know how many people has embarked on which bus/train, remaining seats can be computed by comparing with the bus capacity). The trip information may also include journey data for the current trip (e.g., the journey data of the bus the user is on). In some variations, the system of the present subject matter can determine, e.g., that the user is on a bus, and the bus information from sensor data such as from a GPS sensor of the mobile device. The system can calculate the journey data similar to the driving mode.

In some variations, one or more parameters of trip data can also selected/configured. For example, FIGS. 7-10 show various user-interface and displays that can be provided by the present subject matter where user can browse more details of the selected routes per road section (e.g. at or between different exits of a road) per selected time range (e.g. including the start time and stop time).

In some variations, the system can be implemented using in-memory database technology such as the HANA technology offered by SAP AG. Such implementation can enhance performance by enabling real time analytics to be performed, which is particularly advantageous in providing real time updates and modeling of the present subject matter.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer-implemented method for trip planning comprising:

receiving traffic demand data comprising a plurality of planned trips, each of the planned trips comprising an origin location, a destination location, a planned route, a departure time in the future, and an end time, wherein at least one of the plurality of planned trips is a recurring trip from a recurring origin location and/or to a recurring destination location that is repeated at a recurring departure time of day;

building a traffic prediction model by aggregating the traffic demand data;

generating a suggested route based on a user-specified trip for a user, the user-specified trip comprising a user-specified origin location, a user-specified destination location, and a user-specified departure time in the future, the suggested route comprising a plurality of road sections, standard travel times for each of the plurality of road sections, estimated travel times for each of the plurality of road section, and an expected end time, wherein the suggested route is generated by checking the user-specified trip against the traffic prediction model for route overlap and for travel time overlap;

providing, to the user, the estimated travel times and the standard travel times for display as colored columns or bars on a user interface;

monitoring, after the user has started the user-specified trip, each remaining road section of the plurality of road sections, each of the plurality of road sections defined as a path between one or more traffic lights, one or more traffic stops, and/or one or more exits;

determining, in response to an increase in demand for at least one of the remaining road sections, a plurality of candidate alternative road sections for at least a portion of the remaining road sections;

providing, to the user, details of the plurality of candidate alternative road sections for display on the user interface, the details comprising predicted capacity percentage information for each of the alternative road sections;

receiving a selection of one or more of the plurality of candidate alternative road sections from the user; and updating the suggested route to include the selected road section, wherein the receiving, building, generating, monitoring, determining, providing, receiving, and updating are performed by at least one data processor.

2. The computer-implemented method according to claim 1, further comprising:

receiving, by the at least one data processor, one or more sensor data; and training, by the at least one data processor, the traffic prediction model using the one or more sensor data.

3. The computer-implemented method according to claim 1, further comprising:

generating, by the at least one data processor and when a route overlap is found, a new route to the user-specified destination by minimizing route overlap and travel time overlap with the traffic demand data of the traffic prediction model.

4. The computer-implemented method according to claim 3, further comprising:

generating, by the at least one data processor and when a further route overlap is found, a further route to the specified destination by minimizing route overlap and travel time overlap with the traffic demand data of the traffic prediction model.

5. The computer-implemented method according to claim 1, wherein the receiving, building, determining, and generating are performed using in-memory database.

6. The computer-implemented method according to claim 1, further comprising:

receiving, by the at least one data processor, live traffic demand data; and generating an alternate route, by the at least one data processor, when the live traffic demand data reflect delays in at least a portion of the suggested route, wherein the alternate route is generated to avoid the portion of the suggested route.

7. A non-transitory computer readable medium comprising instructions, which when executed by at least one data processor, perform operations comprising:

receiving, by the at least one data processor, traffic demand data comprising a plurality of planned trips, each of the planned trips comprising an origin location, a destination location, a planned route, a departure time in the future, and an end time, wherein at least one of the plurality of planned trips is a recurring trip from a recurring origin location and/or to a recurring destination location that is repeated at a recurring departure time of day;

building, by the at least one data processor, a traffic prediction model by aggregating the traffic demand data;

generating, by the at least one data processor, a suggested route based on a user-specified trip for a user, the user-specified trip comprising a user-specified origin location, a user-specified destination location, and a user-specified departure time in the future, the suggested route comprising a plurality of road sections, standard travel times for each of the plurality of road sections, estimated travel times for each of the plurality of road section, and an expected end time, wherein the suggested route is generated by checking the user-specified trip against the traffic prediction model for route overlap and for travel time overlap;

providing, to the user, the estimated travel times and the standard travel times for display as colored columns or bars on a user interface;

monitoring, after the user has started the user specified trip, each remaining road section of the plurality of road sections, each of the plurality of road sections defined as a path between one or more traffic lights, one or more traffic stops, and/or one or more exits;

determining, by the at least one data processor and in response to an increase in demand for at least one of the remaining road sections, a plurality of candidate alternative road sections for at least a portion of the remaining road sections;

providing, to the user, details of the plurality of candidate alternative road sections for display on the user interface, the details comprising predicted capacity percentage information for each of the alternative road sections;

receiving a selection of one or more of the plurality of candidate alternative road sections from the user; and updating the suggested route to include the selected road section.

8. The non-transitory computer readable medium according to claim 7, wherein the operations further comprise:

receiving, by the at least one data processor, one or more sensor data; and training, by the at least one data processor, the traffic prediction model using the one or more sensor data.

9. The non-transitory computer readable medium according to claim 7, wherein the operations further comprise:

generating, by the at least one data processor and when a route overlap is found, a new route to the specified destination by minimizing route overlap and travel time overlap with the traffic demand data of the traffic prediction model.

10. The non-transitory computer readable medium according to claim 9, wherein the operations further comprise:

generating, by the at least one data processor and when a further route overlap is found, a further route to the specified destination by avoiding route overlap and travel time overlap with the traffic demand data of the traffic prediction model.

11. The non-transitory computer readable medium according to claim 7, wherein the operations further comprise:

receiving, by the at least one data processor, live traffic demand data; and generating an alternate route, by the at least one data processor, when the live traffic demand data reflect delays in at least a portion of the suggested route, the alternate route being generated to avoid the portion of the suggested route.

12. A trip planning system comprising:

a database configured for storing traffic demand data comprising a plurality of planned trips, each of the planned trips comprising an origin location, a destination location, a planned route, a departure time in the future, and an end time, wherein at least one of the plurality of planned trips is a recurring trip from a recurring origin location and/or to a recurring destination location that is repeated at a recurring departure time of day;

a traffic prediction modeler configured for aggregating the traffic demand data and generating a traffic prediction model; and a route generator configured for generating a suggested route based on a user-specified trip for a user, the user-specified trip comprising a user-specified origin location, a user-specified destination location, and a user-specified departure time in the future, the suggested route comprising a plurality of road sections, standard travel times for each of the plurality of road sections, estimated travel times for each of the plurality of road section, and an expected end time, wherein the suggested route is generated by checking the user-specified trip against the traffic prediction model for route overlap and for travel time overlap, wherein the route generator is further configured for providing, to the user, the estimated travel times and the standard travel times for display as colored columns or bars on a user interface;

wherein the route generator is further configured for monitoring, after the user has started the user specified trip, each remaining road section of the plurality of road sections, each of the plurality of road sections defined as a path between one or more traffic lights, one or more traffic stops, and/or one or more exits, wherein the route generator is further configured for determining, in response to an increase in demand for at least one of the remaining road sections, a plurality of candidate alternative road sections for at least a portion of the remaining road sections, wherein the route generator is further configured for providing, to the user, details of the plurality of candidate alternative road sections for display on the user interface, the details comprising predicted capacity percentage information for each of the alternative road sections, wherein the route generator is further configured for receiving a selection of one or more of the plurality of candidate alternative road sections from the user, and wherein the route generator is further configured for updating the selected road section.

13. The trip planning system according to claim 12, wherein the database is further configured to store one or more sensor data, and wherein the traffic prediction modeler is further configured for training the traffic prediction model using the one or more sensor data.

14. The trip planning system according to claim 12, wherein the route generator is further configured for generating, when a route overlap is found, a new route to the specified destination by minimizing route overlap and travel time overlap with the traffic demand data of the traffic prediction model.

15. The trip planning system according to claim 14, wherein the traffic prediction generator is further configured for generating, when a further route overlap is found, a further route to the specified destination by minimizing route overlap and travel time overlap with the traffic demand data of the traffic prediction model.

16. The trip planning system according to claim 12, wherein the database is further configured for storing an actual departure time.

17. The trip planning system according to claim 12, wherein the database utilizes in-memory database technology.

18. The trip planning system according to claim 12, wherein the database is further configured for storing live traffic demand data, wherein the route generator is further configured to generate an alternate route when the live traffic demand data reflect delays in at least a portion of the suggested route, and wherein the alternate route is generated to avoid the portion of the suggested route.

* * * * *